United States Patent

[11] 3,627,955

[72] Inventor Richard C. Stone, Jr.
Glen Ellyn, Ill.

[21] Appl. No. 882,860
[22] Filed Dec. 8, 1969
[45] Patented Dec. 14, 1971
[73] Assignee Bell Telephone Laboratories, Incorporated
Murray Hill, Berkeley Heights, N.Y.

[54] COMBINED TELEPHONE AND PAGING SYSTEM WHEREIN A CALLING PARTY MAY BE CONNECTED TO A PAGED PARTY AND AN ATTENDANT
9 Claims, 2 Drawing Figs.

[52] U.S. Cl. .................... 179/18 BF
[51] Int. Cl. .................... H04m 3/42
[50] Field of Search .................... 179/18 BF, 18 BC

[56] References Cited
UNITED STATES PATENTS
2,913,533 11/1959 Gatzert et al. .......... 179/18 BF

*Primary Examiner*—Kathleen H. Claffy
*Assistant Examiner*—Thomas W. Brown
*Attorneys*—R. J. Guenther and R. B. Ardis

ABSTRACT: In a combined telephone paging system, a paging call may be answered by the paged party from any station of the system and by an attendant from a call answering console. If the paged party answers after the attendant has answered, a three-way conference connection is established interconnecting the calling party, the attendant, and the paged party.

INVENTOR
R. C. STONE JR.
BY John C Albrecht
ATTORNEY

COMBINED TELEPHONE AND PAGING SYSTEM WHEREIN A CALLING PARTY MAY BE CONNECTED TO A PAGED PARTY AND AN ATTENDANT

BACKGROUND OF THE INVENTION

This invention relates in general to a telephone switching system and more particularly to a branch exchange telephone system operating in conjunction with a paging system.

Combined telephone paging systems are known in which it is possible to page a person by dialing a predetermined paging code and the code number of the desired party. The paged person may then answer from any subscriber station of the system by dialing a predetermined answer code. However, if the paged party is not available at the time of the paging, the call may well go unanswered, since there is no convenient way for an attendant to answer the call for the paged party.

It is an object of this invention to provide a system whereby a paging call may be answered by an attendant if the paged party does not answer within a predetermined period of time, and whereby the paged party is joined to an established talking connection between the calling party and the attendant if the paged party answers shortly after the attendant has answered.

SUMMARY OF THE INVENTION

In accordance with this invention, certain directory numbers are reserved for paging. A call to a reserved number causes a paging transmitter to be activated and, after a predetermined period of time, causes alerting signals to be applied to a call answering console. The paged party may answer the paging call from any of the system's subscriber stations by dialing his assigned answer code. If the paged party does not answer within a predetermined period of time (e.g. 20 seconds), alerting signals in the form of ringing and lamp signals are applied to the call answering console. If the console attendant answers the call before the paged party answers, a talking connection is established between the calling station and the call answering console. In case the paged party subsequently answers from a remote station, the switching system establishes a three-way conference connection between the calling station, the call answering console, and the remote station. A low tone of short duration is applied to the newly established talking paths to inform the parties of the three-way conference connection.

DETAILED DESCRIPTION

The illustrative embodiment of this invention comprises a time division private branch telephone exchange and a paging system. Combined systems of this type are known in the prior art, and are used, for example, in hospitals for the purpose of communicating with personnel in various areas of the hospital. A person in a remote area may be reached by dialing a predetermined paging code from any of the subscriber stations of the system. In response to the paging code, the system causes a uniquely coded paging signal to be transmitted by means of a paging transmitter. The coded paging signal may be received, for example, by means of a small receiver carried by the person expecting to be paged.

Figure 1:
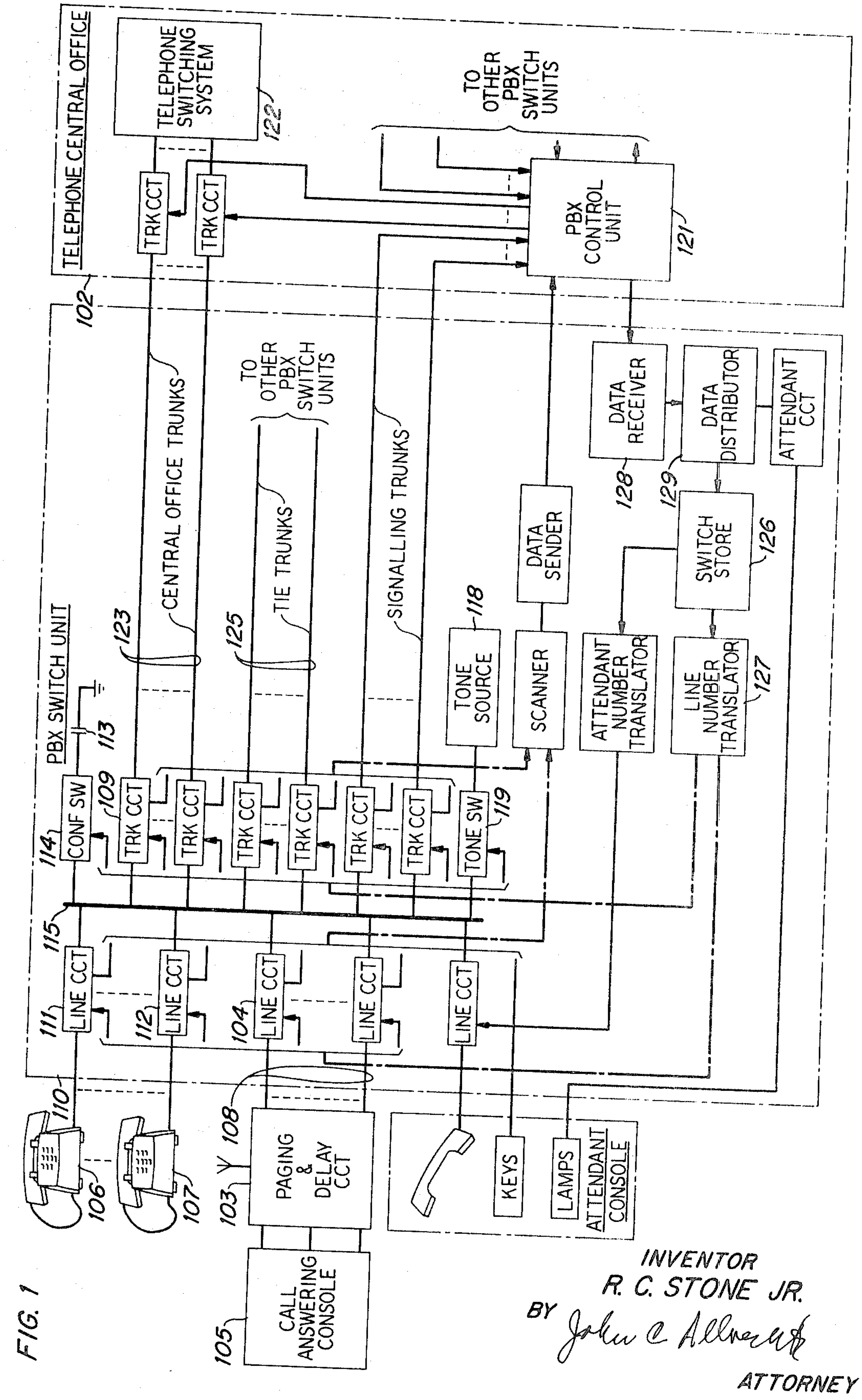
FIG. 1 shows the illustrative embodiment of this invention, in block diagram form, which comprises a time division private branch telephone exchange and a paging system.

Shown in FIG. 1 is a Paging and Delay Circuit 103 interposed between the Call Answering Console 105 and the PBX Switch Unit 110. In this illustrative system all directory numbers having "6" as their initial digit are reserved for paging, and all subscriber lines associated with these directory numbers (i.e., Paging Lines 108) are connected to the Paging and Delay Circuit 103. A call to a paging number may be initiated from any subscriber station of the system such as Station 106, from other PBX switching units which are under control of the PBX Control Unit 121 via tie trunks, or from the Telephone Switching System 122 via central office trunks.

Figure 2:
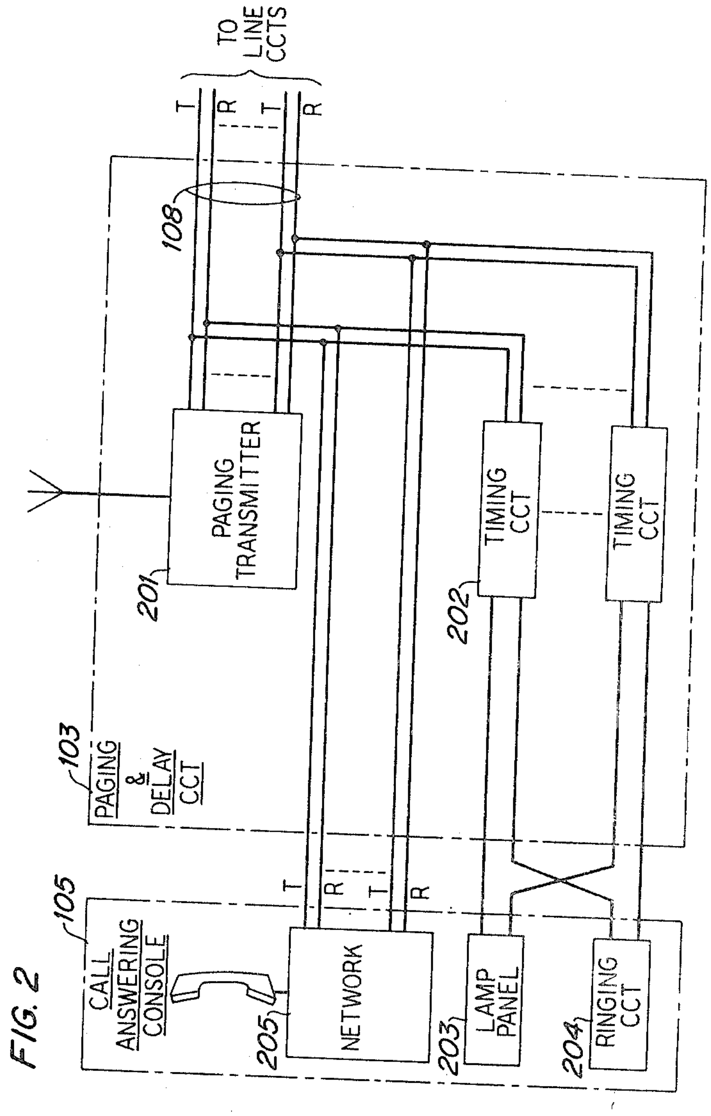
FIG. 2 represents an arrangement for applying activation signals to a paging transmitter and for applying delayed alerting signals to a call answering console.

When a call is extended to a directory number reserved for paging, the PBX Control Unit 121 commands the PBX Switch Unit 110 to apply an alerting signal to the subscriber line associated with the dialed directory number. Since the associated line is a paging line, it is connected to the Paging and Delay Circuit 103. As shown in FIG. 2, both the tip and ring conductors of each of the Paging Lines 108 are connected to the Paging Transmitter 201. Upon the application of ringing current to any of the subscriber lines connected thereto, the transmitter transmits a uniquely coded paging signal which corresponds to the directory number associated with the subscriber line on which the ringing current appears. The tip and ring conductors of each of the Paging Lines 108 are also connected to a timer which is individually associated with the line. For example, the tip and ring conductors of the subscriber line associated with Line Circuit 104 are connected to the Timer 202. Each timer is activated when ringing current is applied to the associated tip and ring conductors. An activated timer produces output signals which are applied to both the Lamp Panel 203 and the Ringing Circuit 204 of the Call Answering Console 105, approximately 20 seconds after activation. When an attendant answers the paging call from the Call Answering Console 105, a connection is established between the console and the PBX Switch Unit 110 by means of the tip and ring conductors of the associated subscriber line which are connected directly to the Network 205 of the console. Should the paged party answer from a remote station before the 20-second period has elapsed, the alerting signal applied to the timer will cease and the timer will be deactivated. Thus, ringing is not applied to the Call Answering Console 105 if the paged party answers before the delay period has elapsed.

In this illustrative time division system a call extended to a paging directory number is handled in the same manner as calls to any other directory number. The PBX Control Unit 121 controls the handling of all calls. This control unit comprises a memory unit in which call associated information is maintained. For each call existing in the system there is an entry in the memory which identifies the calling and called parties' equipment numbers, and information related to connections established to that equipment. When a call is extended to a directory number of the system, a memory entry is made recording the calling party's equipment number. The directory number dialed by the calling party and received by the system, is translated into a called party equipment number which is stored in the same memory entry as the calling party's equipment number. Subsequently, the system uses the called party equipment number to establish a ringing connection from the Tone Source 118 to the called subscriber's station.

Paths in the PBX Switch Unit 110 are established in response to control words which are generated by the PBX Control Unit 121 and are transmitted to the switch unit. These words are received by the Data Receiver 128 and entered into the Switch Store 126 by means of the Data Distributor 129. Each control word comprises information specifying the circuits to be connected to the Time Division Bus 115, and the Switch Store 126 comprises one such control word for each time slot of the bus. The control words are translated by the Line Number Translator 127 which generates signals for connecting the various circuits (e.g., line circuits, trunk circuits, etc.) To the Time Division Bus 115. A timing arrangement internal to the Switch Store 126 causes the store to deliver the control words to the translator at the rate at which the time division system is designed to operate.

When a paging call is answered from the Call Answering Console 105, a talking connection is established through the PBX Switch Unit 110 between the console and the equipment of the party who initiated the call, in the same manner as any nonpaging call. For example, if Station 106 is the calling station and a call is extended to the paging directory number associated with Line Circuit 104, a connection is established between the two parties via Line Circuit 111, the Time Division Bus 115, and Line Circuit 104 during a selected time slot.

As mentioned earlier, a paged party may answer a paging call by dialing an answer code from any subscriber station connected to the switch unit. There are as many answer codes as there are paging directory numbers and, in this illustrative system, each answer code differs from its associated paging directory number only in the initial digit. All paging directory numbers have "6" as the initial digit, while all answer codes have "7" as the initial digit.

When a paged party answers from a remote station by dialing his answer code, the PBX Control Unit 121 translates the first two digits which it receives into a code which specifies a block of memory. The last two digits of the answer code specify a location within that memory block. When the last two digits are received, the PBX Control Unit 121 reads from the specified memory location the called party equipment number associated with the answer code. This equipment number is identical to the called party equipment number which was priorly derived from the paging directory number dialed by the calling party and which was stored in the same memory entry as the calling party's equipment number. Subsequently, the control unit begins to search its memory for the entry which contains that called party's equipment number. When this entry is found, the equipment number of a calling party is obtained therefrom for subsequent use in establishing a talking path between the paged party and the calling party. The system further performs checks to determine whether the called party's equipment is in the ringing state or in the talking state. If it is in the ringing state, indicating that the attendant at the Call Answering Console 105 has not yet answered, the system sends the necessary information to the Switch Store 126 to remove the ringing connections and to establish a talking connection between the calling party's equipment (e.g., Line Circuit 111) and the equipment associated with the station from which the answer code was received (e.g., Line Circut 112). If, upon examination of the called party's equipment, it is found to be in the talking state, indicating that the call has been answered from the console, the system establishes a conference connection between the calling party, the paged party, and the console.

The three-way conference connection is established by means of the Conference Capacitor 113 which is connectable to the Time Division Bus 115 through the Conference Switch 114. When a three-party conference is desired, the first two parties and the capacitor are simultaneously connected to the time division bus during a selected time slot and the third party and the same capacitor are connected to the bus during the next adjacent time slot. Thus, the capacitor is charged during the first time slot and discharged during the second time slot, or vice versa, thereby effectively transferring information from one time slot to the adjacent time slot. Upon receipt of an answer code from a subscriber station and upon finding that a talking path exists between a calling party and the call answering console, the system searches for two adjacent unoccupied time slots. Upon finding such an adjacent pair, information in the Switch Store 126 is updated to cause the establishment of a connection between the calling party, the console, and the capacitor to take place during the first time slot, and to cause the establishment of a connection between the capacitor and the station from which the answer code was received to take place during the second time slot.

In order to apprise all three parties that a conference connection has been established, a one-half second soft tone is applied to the connection. This tone is generated by the Tone Source 118 which is connectable to the time division bus by means of Tone Switch 119. This tone source is applied to the bus during the second of the two adjacent time slots mentioned above, simultaneously with the paged party and the Conference Capacitor 113, during approximately the first half-second of the conference connection.

It is to be understood that the above-described arrangement is merely illustrative of the application of the principles of the invention; numerous other arrangements may be devised by those skilled in the art without departing from the spirit and scope of the invention.

What is claimed is:

1. In combination:

a paging system comprising a paging transmitter; and a telephone switching system comprising:

a plurality of subscriber stations, a switching means responsive to calling signals received from an originating subscriber station to apply ringing signals to apparatus corresponding to said calling signals, first circuit means responsive to said ringing signals for activating said paging transmitter, second circuit means responsive to said ringing signals for applying alerting signals to the subscriber station corresponding to said calling signals a predetermined period of time after receipt of said ringing signals, said switching means, comprising means responsive to an answer signal from said corresponding subscriber station to establish a talking connection between said originating station and said corresponding station, and means responsive to the receipt of a paging answer code corresponding to said calling signal from an other subscriber station to establish a conference connection between said originating station, said corresponding station, and said other station.

2. A telephone switching system comprising:

a switching network, a plurality of subscriber lines connected to said network, a ringing current source connectable to said subscriber lines, a paging system for transmitting alerting signals to called subscribers, control means responsive to calling signals received from an originating subscriber line to activate said paging system to transmit alerting signals to the called subscriber identified by said calling signal and to connect said ringing current source to the called subscriber line associated with said called subscriber, and a scanning arrangement for determining the operational states of said subscriber lines and for generating and transmitting corresponding state change signals, said control means comprising: (1) means to effect a talking connection in said network between said originating line and said called line in response to a state change signal corresponding to said called line received from said scanning arrangement; (2) means to effect a talking connection in said network between said originating line and an other of said subscriber lines in response to an answer code identifying said called subscriber received from said other line prior to the receipt of said state change signal; and (3) means to effect a three-way conference connection in said network between said originating line, said called line, and said other line in response to said answer code received from said other line subsequent to the receipt of said state change signal.

3. A combined telephone and paging system comprising:

means for selectively applying ringing current signals to subscriber lines in response to calling signals received from an originating station;

transmitting means connected to a plurality of subscriber lines reserved for paging and responsive to ringing current signals applied to a selected one of said reserved subscriber lines to transmit uniquely coded paging signals corresponding to said selected line;

timing means responsive to said ringing current signals applied to said selected line to apply alerting signals corresponding to said selected line to a call answering station a predetermined period of time after the application of said signals to said selected line; and a switching arrangement comprising means responsive to an answer signal on said selected line to establish a talking connection between said originating station and said call answering station, and means responsive to a paging answer code corresponding to said calling signals received from an other station for establishing a conference connection among said originating station, said call answering station, and said other station.

4. A combined telephone and paging system in accordance with claim 3 wherein said call answering station comprises a ringing circuit and a lamp panel, and wherein said alerting signals comprise ringing current signals and lamp current signals.

5. A combined telephone and paging system in accordance with claim 3 wherein said means for establishing a conference connection comprises a time division bus and a capacitor, said capacitor, said originating station, and said call answering station being connected to said bus during a first time slot, and said capacitor and said other station being connected to said bus during the next adjacent time slot.

6. A combined telephone and paging system in accordance with claim 3 wherein said system further comprises means for applying an audible tone to said conference connection for a predetermined period of time.

7. The method of answering a paging call in a combined telephone paging system comprising the steps of:

transmitting a paging code in response to and corresponding to calling signals received from an originating station, applying alerting signals to a subscriber station corresponding to said calling signals a predetermined period of time after the transmission of said paging code, and establishing a conference arrangement interconnecting said originating station, said corresponding station, and an other station upon receipt of a paging answering code from said other station.

8. In a combined telephone and paging system:

a paging transmitter, a switching arrangement comprising means responsive to the receipt of calling signals from an originating subscriber station to apply activation signals corresponding to said calling signals to said transmitter;

said transmitter being responsive to said activation signals for transmitting corresponding paging signals:

said switching arrangement comprising means responsive to a paging answer code corresponding to said calling signals received from an other subscriber station to establish a talking connection between said originating station and said other station;

wherein the improvement comprises means responsive to said activation signals for transmitting alerting signals to a corresponding subscriber station a predetermined period of time after application of said activation signals to said transmitter;

means in said switching arrangement operative upon receipt of an answer signal from said corresponding station prior to receipt of said paging answer code to establish a talking connection between said originating station and said corresponding station, and means in said switching arrangement operative upon receipt of said paging answer code from said other subscriber station after receipt of said answer signal to effect a conference connection between said originating station, said corresponding station, and said other station.

9. The method of answering a paging call in a combined telephone paging system comprising the steps of:

1. paging a party by broadcasting a paging code corresponding to calling signals received from an originating party,
2. alerting an attendant by transmitting alerting signals to an attendant station a predetermined period of time after the broadcast of the paging code,
3. connecting the calling party with the attendant only if the attendant answers before the paged party answers, and
4. connecting the paged party to the priorly established connection between the calling party and the attendant if the paged party answers after the attendant has answered.

* * * * *